United States Patent [19]

Kamiller

[11] Patent Number: 4,521,841
[45] Date of Patent: Jun. 4, 1985

[54] PEAK CHARGING CIRCUIT PROVIDING FOR IMPROVED LOOP GAIN AND COMMON MODE NOISE REJECTION

[75] Inventor: Neil A. Kamiller, Lakewood, Ohio

[73] Assignee: Reliance Electric Company, Cleveland, Ohio

[21] Appl. No.: 402,629

[22] Filed: Jul. 28, 1982

[51] Int. Cl.$^3$ .............................................. H02M 1/14
[52] U.S. Cl. .................................... 363/45; 307/351; 363/56; 363/126
[58] Field of Search ..................... 363/21, 25, 45, 47, 363/48, 97, 126, 56, 71; 328/26; 324/119, 105 P; 307/351

[56] References Cited

U.S. PATENT DOCUMENTS

| | | | |
|---|---|---|---|
| 2,648,048 | 8/1953 | Vackár | 324/119 |
| 3,733,537 | 5/1973 | Kernick et al. | 363/56 |
| 4,020,409 | 4/1977 | Ishigaki et al. | 363/45 |
| 4,030,016 | 6/1977 | Marriott | 363/126 |
| 4,128,866 | 12/1978 | Doerre | 363/56 |
| 4,149,233 | 4/1979 | Frosh | 363/71 |
| 4,253,138 | 2/1981 | Shelly et al. | 363/56 |
| 4,425,613 | 1/1984 | Shelly | 363/26 |

FOREIGN PATENT DOCUMENTS

| | | | |
|---|---|---|---|
| 1426507 | 12/1965 | France | 324/119 |
| 60920 | 5/1981 | Japan | 363/21 |

Primary Examiner—William H. Beha, Jr.
Attorney, Agent, or Firm—Michael M. Rickin

[57] ABSTRACT

Circuitry for use in the current control loop of switched mode power supplies which in a first embodiment increases the a-c gain of that loop. In a second embodiment the circuit rejects common mode noise in the loop. In this embodiment the secondary of the transformer used to sense current in the power switching means of the circuit is made up of two windings in series which are wound bifilar with respect to each other. The d-c signal representative of the current in the switching means is taken between one end of the secondary and the center point of the series connection. In a third embodiment the circuit provides a relatively accurate representation of low current in the power switching device. In this embodiment the circuit uses at least one compensation means in series with resistive means connected across the secondary of the transformer to compensate for the turn-on voltage of the at least one diode used in the peak charging portion of the circuit.

8 Claims, 9 Drawing Figures

PEAK CHARGING CIRCUIT PROVIDING FOR IMPROVED LOOP GAIN AND COMMON MODE NOISE REJECTION

BACKGROUND OF THE INVENTION

1. Field of the Invention

The present invention relates to circuitry for providing in a power supply a signal representative of the current flowing in the power switching devices of the supply to thereby control the operation of the supply and more particularly to enhanced versions of that circuitry which allow a number of desirable effects such as increased closed loop a-c gain, increased rejection of common mode noise and accurate representation of low current levels to occur.

2. Description of the Prior Art

Telephone central offices use d-c voltages for a variety of functions. These d-c voltages may be supplied either directly from a bank of batteries or from a power supply which converts the commercially available 60 Hz voltage from the electrical utility into a d-c voltage of proper amplitude. Even if the d-c voltage is supplied directly by batteries, a power supply is ordinarily used to convert the commercial a-c voltage into a d-c voltage for maintaining the charge on the batteries. Where the supply is used for the purposes of charging the batteries after a discharge and/or supplying office load it will be referred to hereinafter as a "charger" and where the supply is used in place of the batteries it will be referred to hereinafter as an "eliminator".

Whether the power supply is used at the central office as a charger or an eliminator, it provides the d-c voltage at its output from the commercially available a-c voltage at its input. Sometimes, and especially when the operating frequency of the supply is above the frequency of the commercial a-c voltage, the supply rectifies the commercially available a-c voltage to peak charge a bank of capacitors at its input. As a result of this rectification, a d-c voltage having a large ripple appears on the capacitors. This ripple has a principal frequency which is 120 Hz or twice the 60 Hz frequency of the commercially available a-c voltage. Ordinarily the amplitude of this ripple on the capacitor bank is much greater than that which is allowed to be present at the output of the charger or eliminator. In addition, as the charger or eliminator is often used to provide d-c voltage for the subscribers' telephones connected to the central office, this ripple may appear on the telephone lines in the form of audible and therefore objectionable noise. It is therefore desirable that the charger or eliminator function in a manner so as to attenuate the ripple.

In the past it was common for chargers and eliminators to be designed so that their power circuitry and control circuitry operated at the 60 Hz frequency of the commercially available a-c voltage. In this manner the ripple could be attenuated through the use of various components designed to operate at that low frequency or harmonics thereof. In order to reduce the size, cost and objectionable noise that ordinarily are associated with chargers and eliminators operating at 60 Hz it has now become common for such supplies to operate at a frequency above the audible range. Selection of such an operating frequency has the desirable characteristic of reducing the size of the supply and any transformers therein which results in a savings of both component costs and supply weight and, in addition, the generation of audible noise by the circuitry used in the supply. The selection of such a high operating frequency does not, however, cause the attenuation of the objectionable ripple described above. One way in which that ripple may be attenuated is to use a filter either at the input or the output of the supply. Such a filter would have to operate at the relatively low frequency of the ripple and would, therefore, involve the use of components which would negate any cost savings obtained by having the supply operate at the higher than audible frequency. It is therefore desirable to find another means by which the ripple may be attenuated without introducing extra cost back into the supply.

Supplies which generate a d-c voltage at their output normally operate in a mode so as to maintain regulation of their voltage. Such regulation is obtained by feeding back a sample of the output voltage to the control circuitry of the supply to thereby control the operation of the power devices in the supply. The voltage control or regulation circuitry associated with the charger or eliminator therefore is designed to have a frequency response which attenuates the objectionable ripple. Power supplies are also designed to operate in a mode wherein instead of maintaining the voltage at their output regulated they limit the current flowing through the power devices in the supply. A supply which operates in that mode will be referred to hereinafter as being in its "current limited mode" of operation.

Power supplies do not typically operate in their current limited mode but do so usually only momentarily and only as a result of an overload condition at their output. Chargers and eliminators, on the other hand, are ordinarily operated in parallel without a measure of true load sharing between the supplies. For that condition of operation at least one of the chargers or eliminators in the parallel combination ordinarily operates in its current limited mode. Control of current is effected in a manner similar to the regulation of the voltage described above. The charger or eliminator includes a circuit in its current control loop which takes a sample of the alternating current flowing through the power devices and derives therefrom a d-c signal representative of that current. The control loop uses that d-c signal to maintain the current in the power devices at some predetermined value. It is therefore desirable that this current control loop also function to attenuate the undesirable ripple. It is also desirable that this current control circuit respond relatively quickly to any sudden change in the current to thereby protect the power devices of the supplies.

Chargers and eliminators may also use the d-c signal representative of the current flowing in the power devices to not only control the amplitude of that current but also in circuitry which responds to the falling of that current below some predetermined minimum amplitude. This circuitry may then either control the operation of the supply or provide a signal indicative of the fact that the current has fallen below that minimum amplitude. As an example, when the supply is used as a charger it might include a circuit which gives rise to an audible and/or visible alarm when the current falls below the minimum amplitude. The occurrence of this alarm indicates that the current supplied by the charger has fallen below the minimum level needed at the central office to supply the office load and/or recharge the batteries after they have been discharged.

In any case, the predetermined minimum amplitude of power device current is usually only some relatively small percentage of the current flowing in the devices at full load. It is therefore desirable that this d-c signal representative of power device current be a true representation of that current particularly at such low amplitudes. In this manner an accurate determination can then be made as to when the current falls below the minimum predetermined amplitude.

Chargers and eliminators, as is well known in the art, may be embodied by using either a single power device or an even number of power devices. The single device conducts only for a part of the period of the operating frequency of the supply and is nonconductive for the remainder thereof, whereas the even number of devices conduct alternately. In those supplies embodied by a single device, the circuitry for deriving a signal representative of the current flowing in the device is relatively insensitive to common mode noise. When the supply is embodied by an even number of such devices, the above-mentioned circuitry, whether or not it includes the desirable high a-c gain and/or the desirable response to low current amplitude, is sensitive to such noise. It is, therefore, desirable that this circuitry for those supplies having an even number of power devices also be insensitive and, therefore, be unresponsive to common mode noise.

As will be described in more detail hereinafter with respect to FIGS. 2a and 2b, while the current control circuits of the prior art do have the desirable speed of response, they do not have the desirable ripple attenuation characteristics or the desirable response to low amplitude currents. In addition, as will be described in more detail hereinafter with respect to FIG. 2b, the prior art current control circuit for a supply having an even number of power devices is sensitive to the common mode noise. The circuit of the present invention represents an enhancement over those prior art current control circuits in that it not only has the desirable speed of response but also may have any one or more of the desirable features described above.

SUMMARY OF THE INVENTION

According to the present invention, there is disclosed a circuit for use in the current control loop of a power supply of the type which includes a switchable power generating means and which controls the current in that means when that current exceeds a predetermined amplitude. In a first embodiment the circuit includes a peak charging means which generates a d-c signal in response to a signal representative of the current flowing in the power switching means. A discharge/charge storage means stores the d-c signal. The circuit also includes a means which is connected to the discharge/storage means and responsive to the d-c signal for increasing the a-c gain of the current control loop. The loop gain increasing means is connected in series combination with the discharge/charge storage means and the combination is connected in parallel with the peak charging means.

The invention is also embodied in a second form in which it rejects common mode noise present in the current control loop in which it is used. In this embodiment the present invention includes the secondary winding means of the transformer used to sense the power switch current. The winding means are two windings connected to each other in series with a center connection and are wound bifilar with respect to each other. A resistive means is connected across the secondary winding means. A peak charging means is also connected across the winding means and is responsive to the a-c signal thereacross to generate between the output terminal of the peak charging means and the center connection a d-c signal representative of the current in the power switching means.

The invention is also embodied in a third form to give a relatively accurate representation of low current in the switchable power means when the power supply uses a transformer to sense the current. In this embodiment, the circuit includes a resistive means connected across the secondary winding of the transformer. Peak charging means having at least one rectifying diode are connected across the secondary winding to generate from the a-c signal thereacross a d-c signal representative of that current. At least one compensation means is connected in series with the resistive means.

DESCRIPTION OF THE DRAWING

FIG. 3a is a block/schematic diagram of the embodiment of FIG. 3 in which the peak charger is embodied in the form shown in FIG. 2a.

DESCRIPTION OF THE PREFERRED EMBODIMENT

Figure 1:
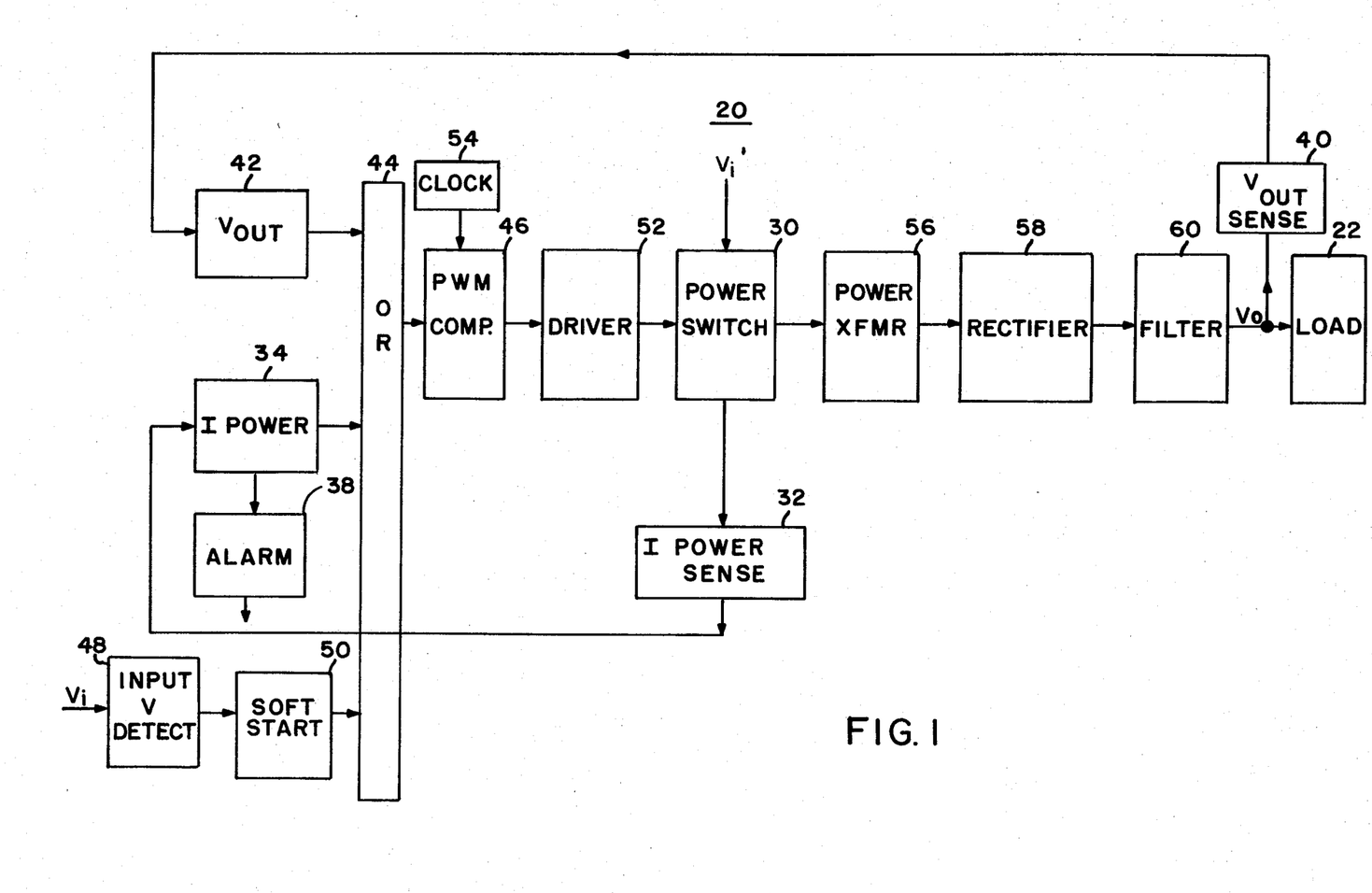
FIG. 1 is a block diagram of a typical switched mode type power supply in which the present invention may be used.

Referring to FIG. 1 there is shown a block diagram for a typical embodiment of the d-c to d-c converter portion of a switched mode power supply 20. Supply 20 also includes a rectifier and capacitor bank (not shown) to obtain an unregulated d-c voltage, designated as Vi, from the commercial a-c voltage. Supply 20 may be used as either a charger or eliminator and has a d-c to d-c converter portion which is of the type wherein a power switch 30 is turned on and off by the use of the well-known pulse width modulation (p.w.m.) technique to thereby provide a d-c output voltage, designated as Vo, from the d-c voltage, Vi. The power switch may be embodied by either a single power device or an even number of power devices which conduct alternately. For ease of description, the circuit of FIG. 1 will be referred to as supply 20 even though the rectifier and capacitor bank are not shown.

The operation of supply 20 is controlled as a function of either its output voltage or current in the power switch 30. Supply 20 includes a circuit 32 which is used to monitor the current in the power switch 30. As is well known in the art, it is desirable to monitor the current in the power switch so as to be able to control the switching of switch 30 in the event that excessive current should flow therein. The current in switch 30 may be monitored by a transformer. The sensing transformer is connected to a circuit 34 which generates a d-c signal which is representative of the current being monitored. Circuit 34 then compares that d-c signal to a predetermined reference signal. Typical prior art embodiments for circuit 34 for use in supplies having single or even number power devices are shown in FIGS. 2a and 2b, respectively, to be described hereinafter.

It may also be desirable to monitor the current in the power switch to determine when that current falls below some predetermined minimum amplitude. Such monitoring might give rise to an audible or visible alarm to indicate that the current has fallen below that minimum amplitude needed to maintain the charge on the central office battery bank. To provide that determination and, therefore, a signal which may be used to provide an alarm indication, supply 20 includes a circuit 38 which is connected to circuit 34 to thereby receive the d-c signal representative of the power device current which is generated by circuit 34. It should be appreciated that circuit 38 represents only one example of how supply 20 may use the d-c signal for making a minimum current determination.

Supply 20 must also monitor its output voltage, Vo, to maintain regulation thereof. A sensing circuit 40 is used to provide a sample of Vo to circuit 42 which compares two voltages. One of the voltages compared by circuit 42 is simply a voltage proportional to Vo and may be obtained by use of a resistive voltage dividing network having Vo as its input voltage. The other voltage compared by circuit 42 is a reference voltage which may be provided by the combination of a zener diode and a resistive network including an adjustable resistor.

Each of the outputs of circuits 34 and 42 are provided as inputs through OR circuit 44 to p.w.m. comparator circuit 46. The output of supply 20 is then controlled by circuit 46 as a function of either the output voltage or the current in power switch 30. A clock circuit 54 provides the sawtooth waveform which circuit 46 uses in its comparison. While circuits 34, 42, 44, 46 and 54 have been shown as separate, they may be embodied by an integrated circuit chip such as type 494 which is available from manufacturers such as Texas Instruments or Motorola.

Sometimes it is desirable to provide circuitry which ensures that the p.w.m. circuitry of the supply does not provide a usable output to switch 30 until such time as the input voltage to the supply reaches a predetermined amplitude. This circuitry is provided in the form of input voltage detector 48 and soft start circuit 50, the output of which is connected as another input to OR circuit 44.

Detector circuit 48 may, for example, be embodied by an operational amplifier, one input of which receives a predetermined reference voltage generated from a stable source such as a zener diode in combination with a resistive voltage dividing network. The other input to the operational amplifier may be connected by a voltage dividing network to receive a voltage representative of the input voltage to supply 20. When the input voltage exceeds the reference voltage, the operational amplifier changes its state to provide a signal to soft start circuit 50.

Soft start circuit 50 may be embodied, for example, by a capacitor which prior to the change in state of the operational amplifier in circuit 48 has been held discharged by a transistor. One end of the capacitor may be connected to a predetermined voltage. The other end of the capacitor is connected to the appropriate one of the inputs of the 494 chip when the p.w.m. circuitry is so embodied. When the operational amplifier changes states, the transistor then allows the capacitor to charge down to common (OV). In response thereto the chip is activated to thereby provide a usable output to switch 30 and associated driver circuit 52.

Supply 20 also includes a power transformer 56 whose primary winding is connected in series combination with switch 30. Connected to the secondary winding of the transformer is the combination of rectifier 58 and filter 60. The circuitry which may be used to embody switch 30, transformer 56, rectifier 58 and filter 60 depends on the type of switched mode power architecture that is used for supply 20. For example, if supply 20 uses the well-known feed forward or, as it sometimes may be called, forward converter architecture, then energy is transferred to the load when power switch 30 is conducting. When the switch is turned off, part of the energy which is stored in filter 60 is transferred to the load through a commutating or free-wheeling diode (not shown) which is connected in shunt between rectifier 58 and filter 60. Rectifier 58 may be embodied in its simplest form by a diode connected in series with the secondary winding of transformer 56. Filter 60 may be embodied in its simplest form by an L-C network in which the inductor is in series with the rectifier diode. It is the energy stored in the inductor which is transferred to the load during the off time of switch 30.

Figure 2A:
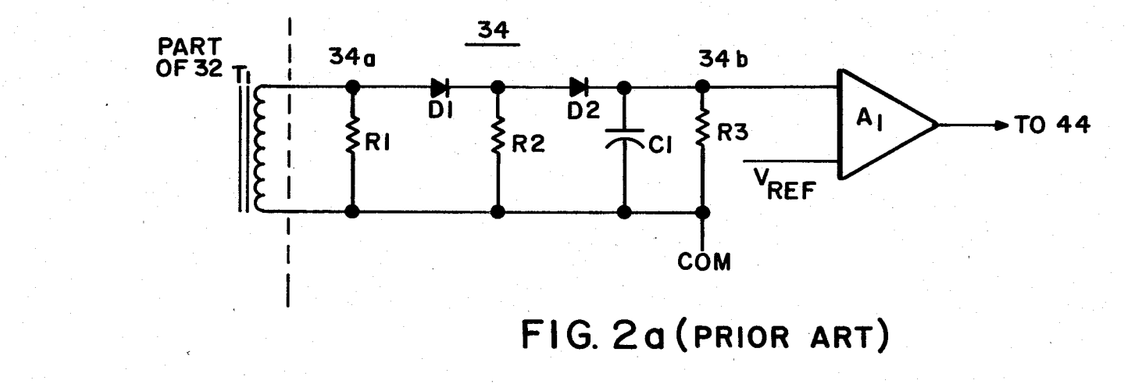
FIGS. 2a and 2b are schematic diagrams of prior art current control circuitry.

Referring to FIG. 2a there is shown a prior art circuit which may be used to embody circuit 34 when supply 20 has a power switch 30 consisting only of a single power device. FIG. 2b shows the prior art embodiment for circuit 34 when supply 20 has an even number of alternately conducting power devices. The current in power switch 30 is monitored by circuit 32 which may be embodied by a transformer T1, the secondary winding of which is shown in FIG. 2a. One end of the secondary winding is connected to circuit common (COM). It is this connection which makes the embodiment of FIG. 2a relatively insensitive to common mode noise. Therefore, there appears between the input terminal designated as 34a of circuit 34 and COM an alternating voltage representative of the current flowing in the power switch. Circuit 34 takes this alternating voltage and generates therefrom a d-c signal representative of the current in the power switch.

Circuit 34 includes a resistor R1 which is connected between terminal 34a and COM and is, therefore, in parallel with the secondary winding of the transformer. A diode D1 has its anode connected to terminal 34a and its cathode connected to one end of a resistor R2. The other end of resistor R2 is connected to COM.

The embodiment shown in FIG. 2a for circuit 34 has assumed that supply 20 includes only a single power device in power switch 30. In such a supply the single device conducts for a portion of each period of the operating frequency of the supply and is nonconductive for the remainder of that period. When the switch conducts, the transformer T1 becomes set but, as the switch cannot conduct in the opposite direction, the transformer does not automatically reset. Diode D1 is included in circuit 34 to disconnect the load from the transformer when the power switch is nonconducting to thereby allow the transformer to reset. In this manner energy which is stored in the transformer core during the time the transformer is set is not dissipated across the transformer load but is used to provide reset energy. Resistor R1 functions to limit the amplitude of the reverse spike which occurs in the voltage when the transformer resets.

Circuit 34 also includes a diode D2 which has its anode connected to the cathode of diode D1 and its cathode connected to the junction designated as 34b of circuit 34. The parallel combination of a relatively small capacitor C1 and a relatively large resistor R3 is connected between junction 34b and COM. The resistor R2 and the capacitor C1 function as a peak charging circuit to charge the capacitor from the relatively high charging current from T1 to a d-c voltage which is representative of the current flowing in the power device. Capacitor C1 is peak charged by diode D2 during the positive-going polarity of the pulsed current flowing through the power switch of supply 20. The relatively large resistance of R3 provides, in combination with C1, a large time constant which prevents C1 from discharging by other than a minimal amount during the off time of the power switch. Therefore, the voltage in capacitor C1 remains substantially constant for a given amplitude of power switch current.

An operational amplifier functioning as an analog comparator and designated as A1 has one of its two inputs connected to terminal 34b to thereby receive the d-c voltage representative of the power switch current. The other input to A1 is connected to a d-c reference voltage which may be generated by any suitably arranged combination of a d-c voltage source and one or more resistors. The reference voltage represents the amplitude to which it is desired to regulate the current flowing through the power switch. The output of the comparator is connected to OR circuit 44 of FIG. 1. It should be appreciated that if the p.w.m. circuitry of supply 20 were embodied using the previously mentioned 494 type chip, then the comparator would be included in the chip and junction 34b and the reference voltage would be connected to pins 16 and 15, respectively, of the chip.

The prior art embodiment for circuit 34 for use in supply 20 having a single power device which is shown in FIG. 2a has the following desirable features:

(1) A fast response to changes in power current to thereby protect the operation of the power device(s) (semiconductor(s)) used in power switch 30. This fast response arises as a result of using a relatively high charging current available from T1, the peak charging diode D2, a relatively small capacitor C1 and the relatively large resistor R3. This combination allows the charge on the capacitor C1 to increase rapidly in response to rapid increases in power switch current. The resistor R3 provides in combination with capacitor C1 a large time constant to maintain the charge on the capacitor during the time that the power device(s) do not conduct. This fast response allows circuit 34 and, therefore, supply 20 to respond rapidly to increases in power switch current above the amplitude represented by the reference voltage to thereby maintain the current at that amplitude.

(2) An accuracy of operation which manifests itself in the form of relatively good parameter stability with changes in supply output voltage, temperature and input voltage. The power switch current at which circuit 34 assumes control of the p.w.m. circuitry from the output voltage control circuit 42 (FIG. 1) is typically set to be some small predetermined percentage above the full load current flowing in the p.w.m. switch. It is desirable that the operation of circuit 34 be stable with variations in input voltage, temperature and output voltage so that the circuit assumes control at essentially the same percentage of overload independent of any variations in those parameters.

(3) A stability against oscillation without any reduction in the desirable speed of response.

(4) An inherent insensitivity to common mode noise due to the connection of one end of the secondary winding of transformer T1 to COM.

While the prior art circuit of FIG. 2a has the various desirable features described above, it does have the major drawbacks of not providing sufficient attenuation to the 120 Hz ripple present in the input capacitor bank and not providing a linear representation of the power device current when the amplitude of that current is relatively small.

The ability of a control loop to attenuate ripple is expressed in terms of the a-c gain of the loop. Circuit 34 is the principal part of that loop. The higher that gain, the more the attentuation. Therefore, that loop and the prior art embodiment of circuit 34 has a low a-c gain. In fact, the stability against oscillation which is exhibited by the prior art circuit of FIG. 2a results in its relatively low a-c gain. It is, however, desirable that the circuit not only have the desirable features described above, but also have a high enough a-c gain to thereby substantially attenuate the 120 Hz ripple present in the capacitor bank of supply 20. In this manner, the amplitude of the ripple at the output of the charger or eliminator will be sufficiently attenuated so as to thereby substantially reduce any audible and therefore objectionable noise that might appear on the telephone lines from the ripple.

The inability of the prior art embodiment of circuit 34 shown in FIG. 2a to provide a linear signal for relatively small currents flowing in the power switch 30 arises from the forward voltage of the diodes which must be overcome before those semiconductor devices conduct. The forward voltage of a diode is typically in the order of 0.6 volt and may, depending on the full load current provided by supply 20 and the amplitude of the d-c voltage which circuit 34 generates to be representative thereof, be a significant percentage of that voltage. Therefore, circuit 34 might not be able to provide a d-c voltage representative of current when the amplitude of that current becomes low enough to be at that amplitude which might give rise, for example, to an alarm signal.

Figure 2B:
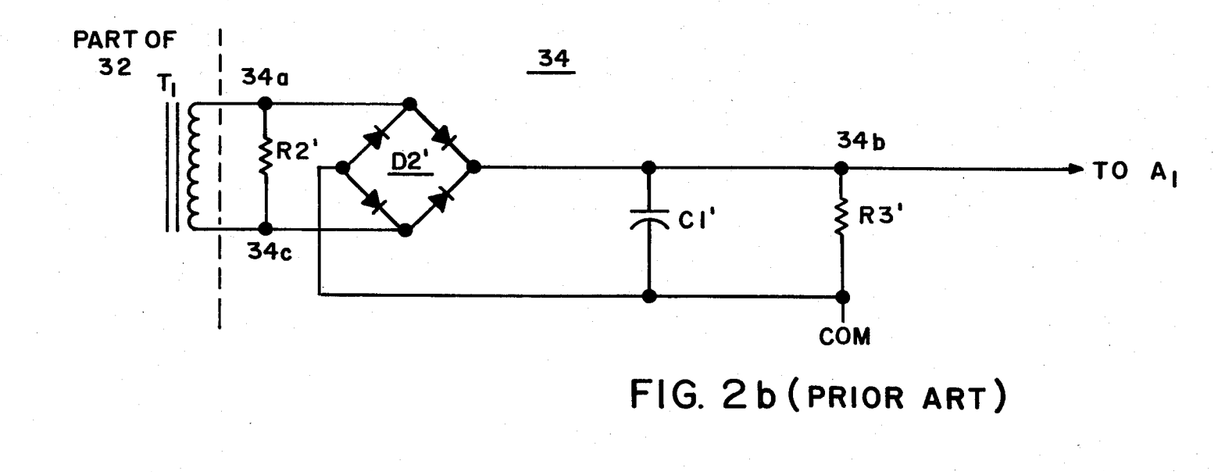

Referring to FIG. 2b there is shown a prior art embodiment for circuit 34 when supply 20 has a power switch 30 consisting of an even number of alternately conducting power devices. As the circuit of FIG. 2b operates in substantially the same manner as that described above for the circuit shown in FIG. 2a, the components of the circuit of FIG. 2b are given the same identifiers as those used for the like functioning components in FIG. 2a but are distinguished therefrom by the use of a prime after the identifier.

As the circuit of FIG. 2b is used in a supply whose power devices conduct alternately, the core of the transformer T1 is automatically reset upon the conduction of the alternate power device. Therefore, the circuit of FIG. 2b does not include components equivalent to resistor R1 and diode D1 of FIG. 2a which are used in that embodiment to allow the reset of the transformer core. Additionally, the secondary winding of transformer T1 is not connected to COM as is the secondary winding in the embodiment of FIG. 2a. The transformer is, therefore, floating with respect to COM. In addition, the peak charging diode in the embodiment of FIG. 2b, while carrying the designation D2', is, in fact, as shown a bridge configuration of four diodes with the input to the bridge being connected across the secondary winding of the transformer at the input terminals 34a and 34c of circuit 34. Capacitor C1' and resistor R3' are connected in parallel between junction 34b and COM to which the output terminals of the bridge are connected. As in the circuit shown in FIG. 2a, the capacitor C1' is peak charged by the relatively high charging current available from T1. Terminal 34b is connected to one input of comparator A1 which has not been shown in FIG. 2b as it is identical in function to the A1 of FIG. 2a.

The prior art circuit of FIG. 2b has for the reasons discussed in connection with FIG. 2a the same desirable speed of response, accuracy of operation and stability against oscillation that the circuit of FIG. 2a has. The prior art circuit of FIG. 2b also has the same drawbacks with respect to attenuation of the a-c ripple and not providing a linear representation of low amplitude power device current as described previously for the circuit of FIG. 2a. In addition, as the secondary winding of T1 is not connected to COM but is floating with respect to COM, the circuit does not have the inherent insensitivity to common mode noise that is exhibited by the circuit of FIG. 2a.

From the descriptions of the prior art embodiments shown in FIGS. 2a and 2b for circuit 34, it is clear that such circuits not only have the desirable features described but also may be enhanced to thereby overcome the drawbacks, either alone or in combination. Therefore, for a supply which has only a single power device circuit 34 should have enhancements available for use therein which allow the circuit to substantially attenuate the ripple and/or provide a voltage on the capacitor which is a substantially accurate representation of current in the power device even when the amplitude of that current is relatively small. For a supply which has an even number of alternately conducting devices, circuit 34 should not only have available for use therein, either alone or in combination, the enhancements described above, but also should have available for use therein, either alone or in combination with the other enhancements, an enhancement which permits the circuit to be substantially insensitive to common mode noise.

Figure 3:
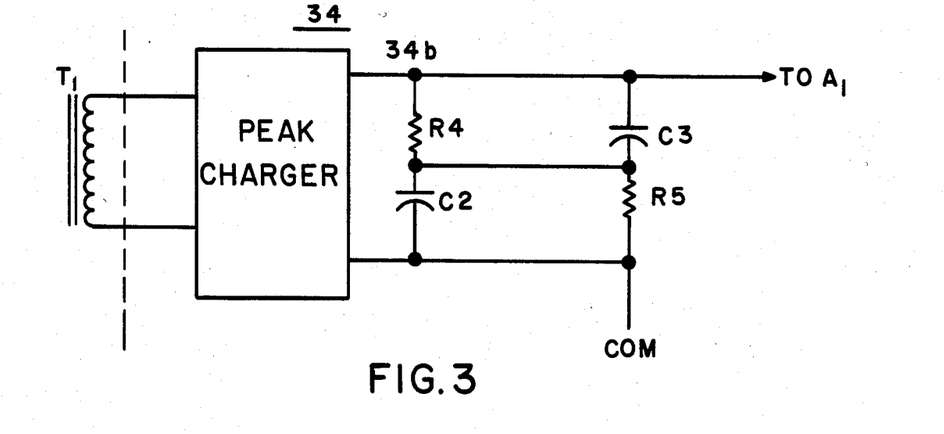
FIG. 3 is a block/schematic diagram of the embodiment of the present invention which allows for increased a-c loop gain.
Figure 4:
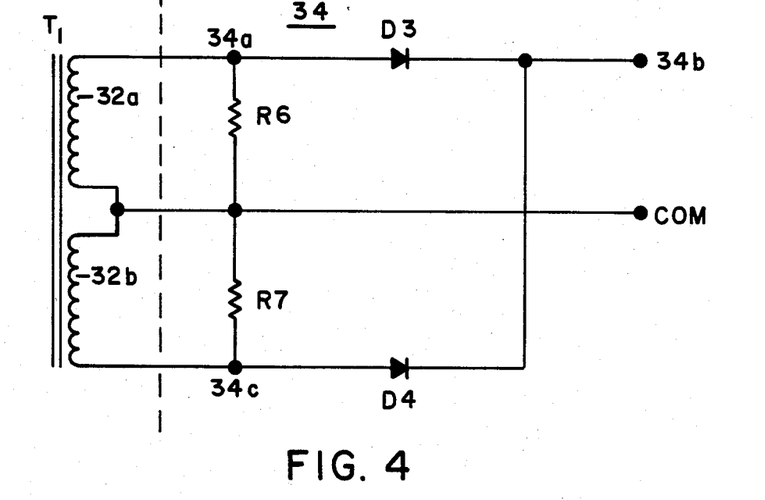
FIG. 4 is a schematic diagram of the embodiment of the present invention which allows for rejection of common mode noise.
Figure 5:
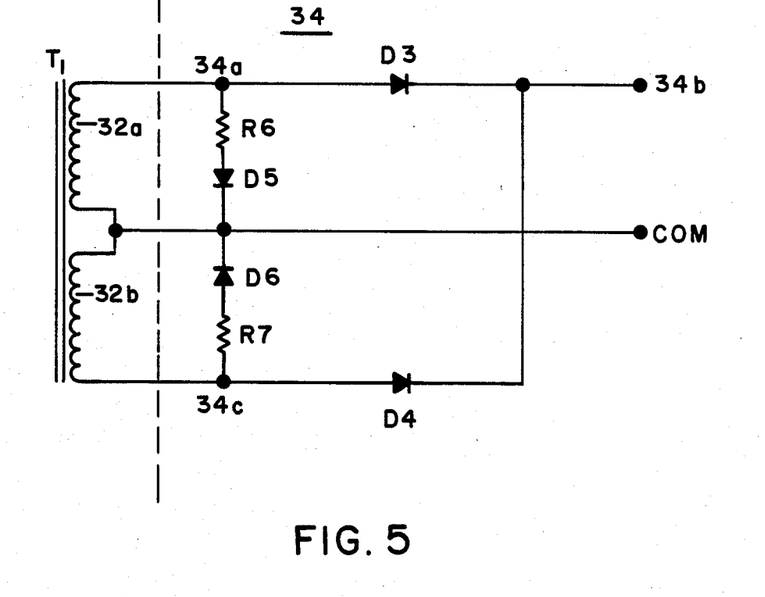
FIGS. 5 and 6 are schematic diagrams of those embodiments of the present invention which allow for a relatively accurate representation of low current in the power switching means of the supply.
Figure 6:
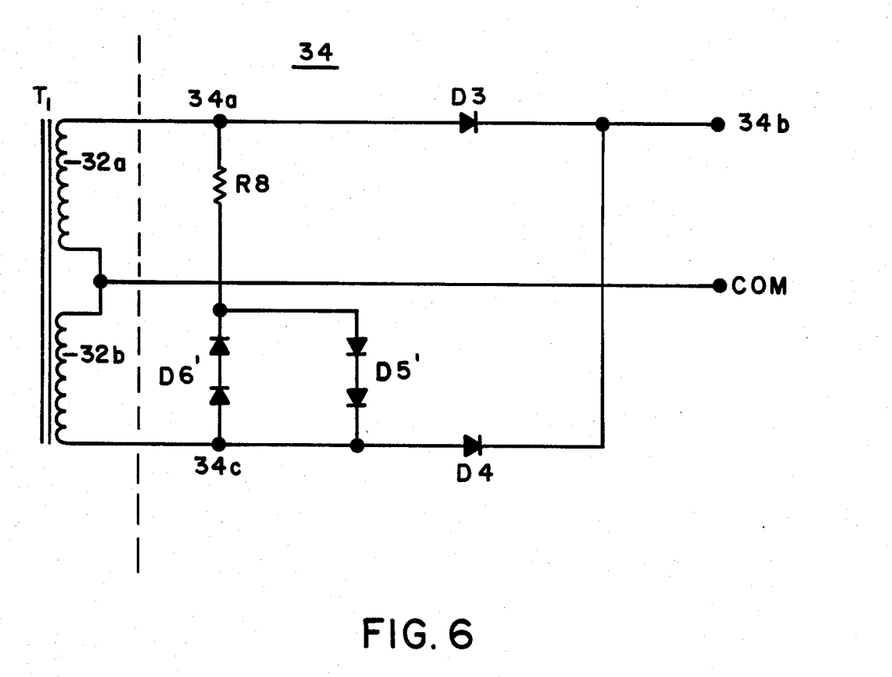

Each of the above enhancements will now be described in connection with the circuit diagrams shown in FIGS. 3, 4, 5, and 6. The diagram of FIG. 3 shows the circuit 34 of either FIG. 2a or 2b with an enhancement which allows the circuit to have increased a-c gain to thereby substantially attenuate ripple without losing the desirable features of fast response, accuracy of operation and stability against oscillation. The diagram of FIG. 4 shows the circuit 34 for use in a supply having pairs of alternately conducting devices which has the enhancements therein to reject common mode noise. The diagrams of FIGS. 5 and 6 show the circuit 34 with the enhancement therein to allow the circuit to provide a substantially accurate representation of power switch current even when the amplitude of that current is relatively small.

Referring now to FIG. 3 there is shown the enhanced version of circuit 34 whether used in a supply having only one or pairs of alternately conducting power devices to provide the desired a-c gain and, therefore, attenuation to the 120 Hz ripple. As this enhancement to circuit 34 has no effect on the peak charging portion of the circuit, that part of the circuit, whether comprised of the components R1, D1, R2 and D2 of FIG. 2a or R2' and D2' of FIG. 2b, has been designated in FIG. 3 by the label "Peak Charger". It should be appreciated that for a power supply having only a single power device the peak charging circuit also includes those components needed to reset the transformer T1.

The enhancement to the circuit 34 which results in high a-c gain consists of replacing the combination of C1, R3 of FIG. 2a or the combination of C1', R3' of FIG. 2b with the circuit consisting of the capacitors C2 and C3, resistors R4 and R5 shown in FIG. 3. The series combination of the resistor R4 and the capacitor C2 is connected between terminal 34b and COM with one end of the resistor R4 connected to terminal 34b and the end of capacitor C2 not connected to R4 being connected to COM. In a similar manner, the series combination of capacitor C3 and the resistor R5 is connected between terminal 34b and COM with one end of C3 being connected to 34b and the end of R5 not connected to C3 being connected to COM. In addition, the midpoints of the R4, C2 and C3, R5 combinations are connected to each other.

For ease of understanding the enhancement of FIG. 3, the capacitor C2 may be taken to be equivalent to the capacitor C1 or C1' of FIG. 2a or 2b and the resistor R5 may be taken to be equivalent to the resistor R3 or R3' of FIG. 2a or 2b. It should be appreciated that the capacitor, whether it be C1 or C1' or C2, provides a reservoir of stored charge and that the resistor, whether it be R3 or R3' or R5, provides a path for discharging the capacitor and, in combination therewith, determines the time constant for the discharge. Therefore, the combination of R3, C1 or R3', C1' or R5, C2 may be considered to be a discharge/charge storage network. The components C3 and R4 which represent the enhancement to the discharge/charge storage network of FIG. 2a or 2b allow the a-c gain of the current control loop of which circuit 34 is a part to be substantially increased over this gain which exists in the loop without the enhancement. Therefore, the combination of R4 and C3 may be considered to be a loop gain increasing network.

Figure 3A:
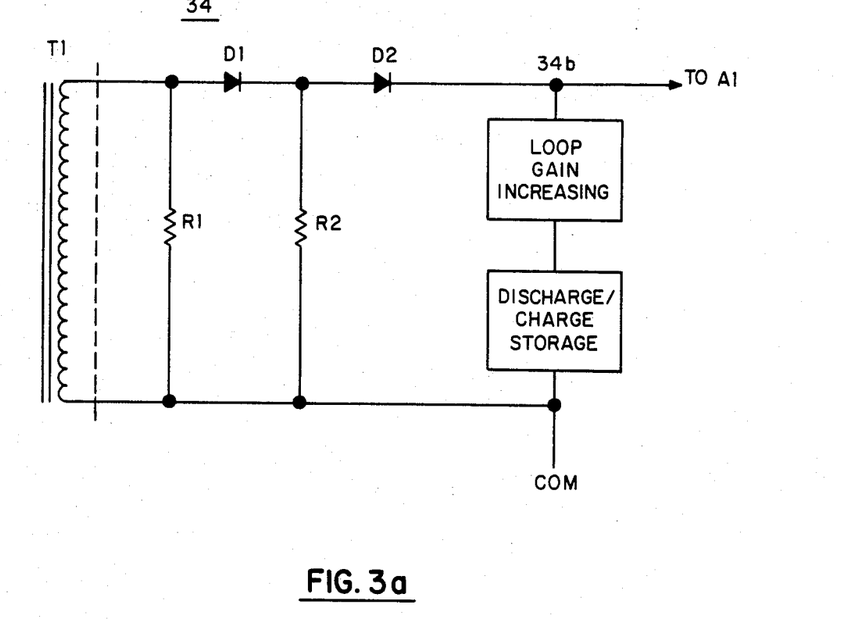

For ease in understanding the enhancement of circuit 34 shown in FIG. 3, there is shown in FIG. 3a the enhanced version of circuit 34 in which the Peak Charger is embodied by the components R1, D1, R2, D2 of FIG. 2a. In FIG. 3a, the combination of R4 and C3 is shown in block form with the label "Loop Gain Increasing" and the combination of R5 and C2 is also shown in block form with the label "Discharge/Charge Storage".

In a power supply having a circuit 34 constructed first in accordance with the prior art and then as shown in FIG. 3, a 12 db improvement has been found to occur in the amplitude of the 120 Hz ripple when the enhanced circuit of FIG. 3 was used. In the circuit constructed in accordance with the prior art, components having the following values were used:
  C1 or C1'=0.1 microfarad
  R3 or R3'=1×10⁶ ohms
In the circuit constructed in accordance with FIG. 3, components having the following values were used:
  C2=0.1 microfarad
  R5=221×10³ ohms
  R4=1500 ohms
  C3=0.001 microfarad
As can be seen from the above, the resistance of resistor R5 is approximately one-fifth (1/5) of the resistance of resistor R3 or R3'. In fact, it has been found that when the resistance of resistor R5 was initially set to have the same value as the resistance of R3 or R3', the a-c gain of circuit 34 could be substantially increased by lowering the resistance of that resistor to the value given above. In addition, this resistance value for R5 has been found not only to give the desirable high a-c gain but does not in any way impair the speed of response, stability against oscillations and accuracy of circuit 34. It should be appreciated that it is the inclusion of the loop gain increasing network and in particular R4 which allows R5 to be decreased in resistance value from that given for R3 or R3'. It should further be appreciated that the ratio of the resistance value for R5 to the resistance value for R3 or R3' is approximately equal to the improvement in ripple amplitude obtained with the circuit of FIG. 3.

It has also been found that, as the resistance of R5 decreases from some value which is lower than the value given above, the a-c gain of the circuit starts to decrease and will become zero when R5 has zero resistance, i.e. a short circuit. The specific value of R5 at which the a-c gain starts to decrease is dependent on a number of different factors including but not limited to the impedance of the circuit of which T1 is a part. It should be appreciated that the resistance value for R5 given above is not that value which gives rise to maximum a-c gain in the current control loop. In fact, if R5 were selected to have that resistance value which gives rise to maximum a-c gain, the control loop might well be oscillatory.

Figure 3B:
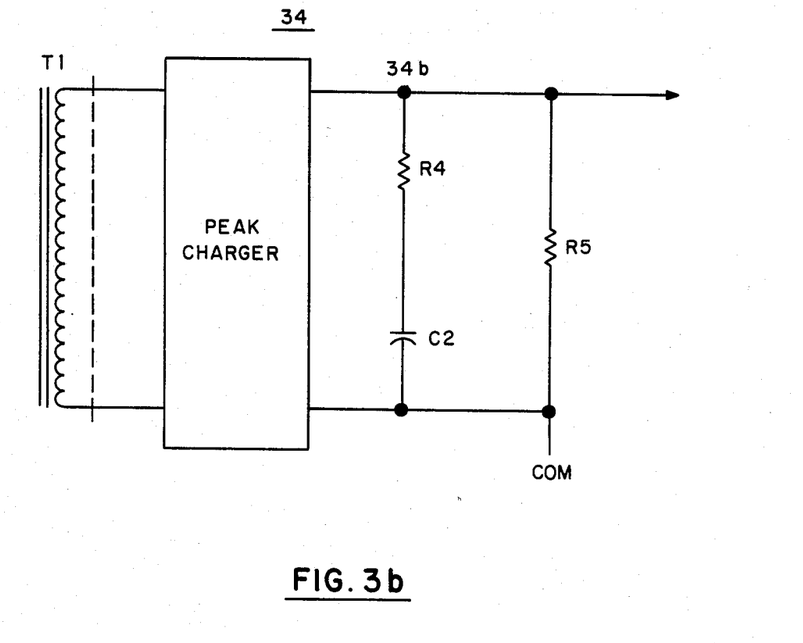
FIG. 3b is an alternative block/schematic diagram of the invention of FIG. 3.

It has also been found that, while the capacitor C3 aids in the stability of circuit 34, it may be omitted from the circuit provided that the instability which arises from its omission can be tolerated by the supply. This instability manifests itself in the form of having circuit 34 oscillate about the amplitude of power device current at which the supply changes from its voltage regulated mode to its current limited mode of operation. Should it be found acceptable to eliminate capacitor C3 from circuit 34, the enhancement to the circuit would then consist of the resistor R5 in parallel with the series combination of R4 and C2. That enhancement is shown in FIG. 3b. In that case, the resistor R4 would be considered to be the loop gain increasing network. Of course, R5 would still have the substantially reduced resistance (as compared to its value in the circuit of FIG. 2a or 2b) described above.

Referring to FIG. 4 there is shown an embodiment for circuit 34 as well as for transformer 32 for use in a supply having a pair of alternately conducting power devices which incorporates enhancements which allow that circuit to be insensitive to common mode noise, either alone or in combination with the enhancement described in FIG. 3. The enhancement described in FIG. 3 relates to the arrangement of the capacitors and resistors to thereby have increased a-c gain. The circuit of FIG. 4 need not have that increased a-c gain in order to be insensitive to common mode noise. Therefore, the arrangement of capacitors and resistors which may be connected between terminal 34b and COM may be either that shown in FIG. 2b or FIG. 3, depending on the results desired.

The circuit of FIG. 4 rejects common mode noise by making changes to both the secondary winding of transformer T1 and to the peak charging portion of circuit 34. More specifically, the secondary winding of the transformer is center tapped, as shown, to thereby be divided into a first part, designated as 32a, and a second part, designated as 32b. The center tap of the transformer secondary is connected to COM. It has been found that the two parts of the secondary winding must be wound in a bifilar manner in order that circuit 34 exhibit the desired insensitivity to common mode noise.

A resistor R6 is connected across winding portion 32a between input terminal 34a and the center tap of the winding. A resistor R7 is connected across winding portion 32b between the winding center tap and input terminal 34c. The resistors R6 and R7 provide load resistance for the transformer in a manner similar to resistor R2' of FIG. 2b. While two separate resistors have been shown in FIG. 4, a single resistor connected across the winding portions 32a and 32b from terminals 34a to 34c may also give acceptable results.

A diode D3 has its anode connected to terminal 34a and its cathode connected to terminal 34b. A diode D4 has its anode connected to terminal 34c and its cathode also connected to terminal 34b. The diodes provide peak charging for the capacitor C1 or C2, as the case may be, which is charged to the voltage representative of the current flowing in the power devices.

It has been found that this modification to the secondary of transformer T1 in combination with the reconfiguration of the peak charging portion of circuit 34 allows that circuit to reject common mode noise yet still provde the desirable features described in connection with the circuit 34 shown in FIG. 2b.

Referring to FIG. 5 there is shown an embodiment for circuit 34 which includes therein the enhancement which allows the circuit to provide a signal across the capacitor which is representative of current flowing in the power switch even when the amplitude of that current is relatively small. FIG. 5 shows the low amplitude current response enhancement in a circuit 34 which is used in a supply having pairs of alternately conducting power devices. Therefore, the circuit 34 of FIG. 5 also includes the insensitivity to common mode noise enhancement described in connection with FIG. 4. It should, however, be appreciated that the enhancement of FIG. 5 may also be used in the prior art circuit of FIG. 2a to allow that circuit to provide a substantially accurate representation of relatively low amplitude power device current.

The enhancement to circuit 34 which allows the circuit to provide a substantially accurate representation of low amplitude power device current consists of adding a diode or diodes, such as D5 and D6, in series with the load resistor(s) to thereby compensate for the forward voltage which must be developed across the peak charging diode(s) before they conduct. Typically that forward voltage is in the order of 0.6 volts. The d-c voltage developed across the capacitor C1 or C1' or C2 which is representative of power device current may only range from zero volts (0 V) at no load to 6 V at full load. Therefore, the diode forward voltage may be equivalent to a power device current whose amplitude is ten percent (10%) of the amplitude of the full load current which flows in the power devices. In other words, without any compensation included therein circuit 34 would not provide a d-c voltage which is a substantially accurate representation of power device current until the amplitude of that current increased to some predeterminable percentage of its full load amplitude. Therefore, without the enhancement described above, circuit 34 would not be useful to provide a substantially accurate representation of low amplitude power device current.

As shown in FIG. 1, the circuit 34 may be connected to an alarm circuit 38 which is used to provide a signal to a suitably arranged alarm indicator when the current flowing in the power devices is below some predetermined minimum amplitude. While an embodiment for circuit 38 has not been shown in any of the drawing figures, it would be obvious to those skilled in the art that the circuit may be embodied by an operational amplifier which functions as an analog comparator in a manner identical to that of comparator A1 of FIG. 2a. One input of the comparator would be connected to receive the d-c voltage across capacitor C1 or C1' or C2 which is representative of current flowing in the power devices while the other input would be connected to receive a reference voltage whose amplitude is representative of the predetermined minimum power device current. If the voltage across the capacitor at which it was to indicate an alarm was below 0.6 volts, then, without the enhancement of FIG. 5 included in circuit 34, circuit 38 would be unable to accurately provide such an alarm.

As described, the enhancement which allows this substantially accurate representation of low power device current to occur consists of diode(s) in series with the load resistor(s). In the circuit 34 shown in FIG. 5, the enhancement or modification has been embodied by placing a compensating diode D5 in series with load resistor R6 and a compensating diode D6 in series with load resistor R7. Diode D5 has its anode connected to that end of R6 which is not connected to terminal 34a and its cathode connected to COM. Diode D6 has its anode connected to that end of R7 which is not connected to terminal 34c and its cathode connected to COM. Diode D5 compensates for the forward turn-on voltage of peak charging diode D3 whereas diode D6 compensates for the forward turn-on voltage of peak charging diode D4. It has been found that while the volt-ampere characteristics of diodes vary with temperature, diode pairs D5 and D3; and D6 and D4 compensate each other for such temperature variations to thereby provide additional stability with temperature to circuit 34. It has also been found that it is not necessary for the diodes of each pair to be matched in order to achieve the improved stability with temperature variations of circuit 34.

While the modification which allows circuit 34 to make a relatively accurate representation of low power device current has been shown in connection with the circuit of FIG. 4, it should be appreciated that this modification may also be used in the embodiment of circuit 34 shown in FIG. 2a in the manner described below. For the circuit shown in FIG. 2a, the modification would consist of adding a single diode in series with resistor R2. Whether added above or below R2, the anode of the diode would be connected to terminal 34a and the cathode would be connected to COM. In this manner, the embodiment of FIG. 2a would then be able to provide across capacitor C1 a voltage which is a relatively accurate representation of low power device current. When the diode is added in series with R2, then diode D1 can be eliminated. The modification may also be used in the embodiment of circuit 34 shown in FIG. 2b and in the embodiment of circuit 34 shown in FIG. 4 wherein a single resistor replaces R6 and R7 as will be described hereinafter in connection with FIG. 6.

Referring now to FIG. 6, there is shown the modification which allows circuit 34 to provide a relatively accurate representation of low power device current when resistors R6 and R7 of the embodiment shown in FIG. 4 are replaced by the single resistor R8. In that case, the parallel combination of the diode chains designated as D5' and D6' is placed in series with resistor R8. As all of the other components of circuit 34 remain unchanged, these components carry the same designations as they do in FIG. 4. In particular, each diode chain D5' and D6' consists of the series combination of two diodes having the same polarity with respect to each other.

Two diodes are needed in each chain to compensate for the forward drop of each of diodes D3 and D4 as the diode chains and resistor R8 are connected across the entire secondary winding of T1 rather than across each half 32a, 32b as in the embodiment of FIG. 5. Therefore, in order to obtain a voltage which compensates for the forward turn-on voltage of D3 or D4, two diodes must be used in the D5' and D6' diode chains. In effect, the two diodes D5' appear by action of the transformer as a single diode to thereby compensate for the forward turn-on voltage of D3 and the two diodes D6' also appear by action of the transformer T1 as a single diode to compensate for the forward turn-on voltage of diode D4.

The arrangement of diodes D5' and D6' as shown in FIG. 6 may also be used in connection with the embodiment of circuit 34 of FIG. 2b to allow that circuit to accurately represent low power device current. For that embodiment, the diode chains D5' and D6' are placed in series with resistor R2' in the same manner as they are placed in series with resistor R8 of FIG. 6. One of the two chains then compensates for the forward voltage drops of those two of the four diodes of bridge D2' that conduct when the voltage across the secondary winding of T1 is of a polarity to make terminal 34a positive and terminal 34c negative. The other of the two chains then compensates for the forward voltage drop of the other two of the four diodes of bridge D2' which conduct when the polarity of the voltage across the secondary winding of T1 is opposite to that described above.

While the modification which allows circuit 34, no matter how embodied, to provide a relatively accurate representation of low power device current has been shown and described with the compensating diode or diodes connected below the associated resistor, it should be appreciated that the compensating diode or diodes may also be connected above the associated resistor. The only requirement is that the compensating diode or diodes and the associated resistor be connected in series across either all or half of the secondary winding of T1 as shown in FIGS. 5 and 6 and as described above for all of the various embodiments of circuit 34 shown in FIGS. 2a, 2b and 4.

It is to be understood that the descriptions of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. An a-c gain increasing circuit for use in the current control loop of a power supply of the type which includes a switchable power generating means and controls the current in said switchable power means when the amplitude of a signal representative of that current exceeds a predetermined reference said supply including means to sense the current and generate said representative signal, said circuit comprising:

(a) peak charging means responsive to said representative signal for generating a d-c signal whose amplitude is a function of said switchable power means current;

(b) discharge/charge storage means responsive to said peak charging means signal for storing said d-c signal; and (c) loop gain increasing means connected in series combination with said discharge/charge storage means, said series combination being connected in parallel with said peak charging means, said loop gain increasing means responsive to said peak charging means signal for increasing the a-c gain of said current control loop.

2. The circuit of claim 1 wherein said discharge/charge storage means includes capacitive means for storing said d-c signal.

3. The circuit of claim 2 wherein said loop gain increasing means includes at least resistive means connected in series combination with said capacitive means.

4. The circuit of claim 3 wherein said discharge/charge storage means further includes resistive means connected in parallel with said capacitive means.

5. The circuit of claim 4 wherein said loop gain increasing means further includes capacitive means connected in parallel with said loop gain increasing means resistive means.

6. The circuit of claim 1 wherein said loop gain increasing means includes at least a resistive means connected in series combination with said discharge/charge storage means.

7. The circuit of claim 6 wherein said loop gain increasing means further includes capacitive means connected in parallel with said resistive means.

8. An a-c gain increasing circuit for use in the current control loop of a power supply of the type which includes a switchable power generating means and controls the current in said switchable power means when the amplitude of a signal representative of that current exceeds a predetermined reference said supply including means to sense the current and generate said representative signal, said circuit comprising:

(a) peak charging means responsive to said representative signal for generating a d-c signal whose amplitude is a function of said switchable power means current;

(b) first resistive means connected in parallel with said peak charging means; and (c) second resistive means connected in series combination with a capacitive means, said series combination being connected in parallel with said peak charging means, said capacitive means and said first resistive means forming a discharge/charge storage means responsive to said peak charging means signal for storing said d-c signal, said second resistive means responsive to said peak charging means for increasing the a-c gain of said current control loop.

* * * * *